US009389033B1

(12) United States Patent
Underwood et al.

(10) Patent No.: US 9,389,033 B1
(45) Date of Patent: Jul. 12, 2016

(54) POLYMER/COMPOSITE FIREARMS AND A PROCESS FOR STRENGTHENING POLYMER/COMPOSITE FIREARMS

(71) Applicant: MEAN LLC., Woodstock, GA (US)

(72) Inventors: James Matthew Underwood, Kennesaw, GA (US); Larry Cullen Underwood, Canton, GA (US)

(73) Assignee: MEAN L.L.C., Woodstock, GA (US)

( * ) Notice: Subject to any disclaimer, the term of this patent is extended or adjusted under 35 U.S.C. 154(b) by 0 days.

(21) Appl. No.: 15/061,016

(22) Filed: Mar. 4, 2016

Related U.S. Application Data

(62) Division of application No. 13/971,681, filed on Aug. 20, 2013, now Pat. No. 9,297,599.

(51) Int. Cl.
*F41A 3/66* (2006.01)

(52) U.S. Cl.
CPC .................................... *F41A 3/66* (2013.01)

(58) Field of Classification Search
CPC ................................ F41A 3/66; F41A 21/48
USPC ................................................ 42/75.02, 16
See application file for complete search history.

(56) References Cited

U.S. PATENT DOCUMENTS 5,632,108 A 5/1997 Ruger et al.
6,070,354 A 6/2000 Burigana et al.
7,814,695 B1 10/2010 Keeney et al.
8,789,305 B1 7/2014 DiChario et al.
9,068,786 B2 * 6/2015 DiChario .................. F41A 3/66
2006/0283067 A1 12/2006 Herring et al.
2014/0230297 A1 8/2014 Larson, Jr. et al.
2015/0000171 A1 1/2015 Roberts

OTHER PUBLICATIONS

U.S. Appl. No. 13/971,681 , Non-Final Office Action, mailed Jun. 3, 2015, 8 pages.
U.S. Appl. No. 13/971,681 , Notice of Allowance, mailed Nov. 18, 2015, 10 pages.

* cited by examiner

*Primary Examiner* — Reginald Tillman, Jr.
(74) *Attorney, Agent, or Firm* — Kilpatrick Townsend & Stockton LLP; Tiffany L. Williams; Davidson G. Lucas

(57) ABSTRACT

A strengthened firearm includes at least one metal/composite material formed into at least one firearm component, and a polymer/composite material combined with the at least one firearm component. The metal/composite material replaces the polymer/composite material in a specific area or component of the firearm that may be weak or tend to fail earlier than other areas or components of a polymer/composite firearm. The method of combining the multiple materials allows for additional strength in the firearm.

17 Claims, 4 Drawing Sheets

22
20
14
28
18
10
16

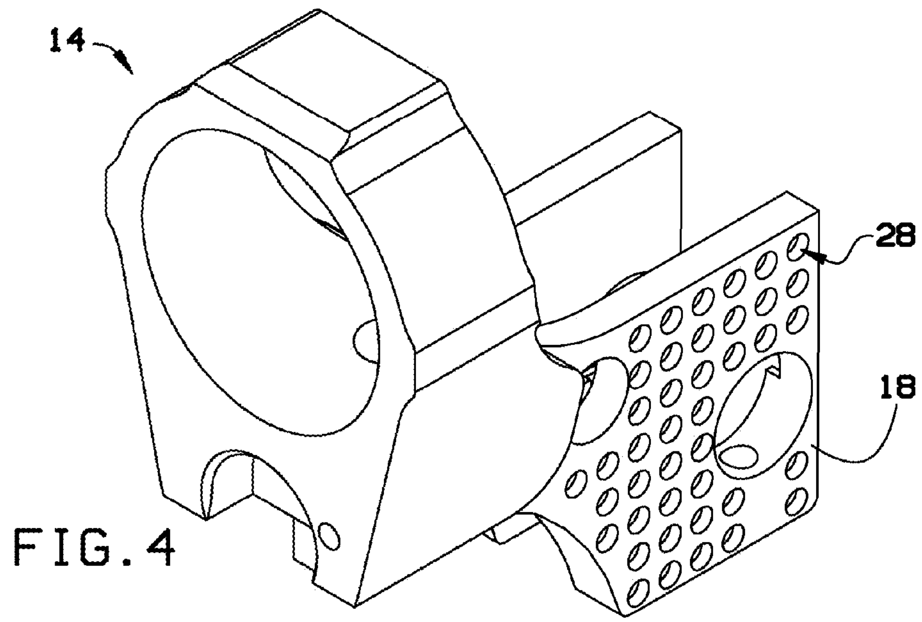
FIG.4
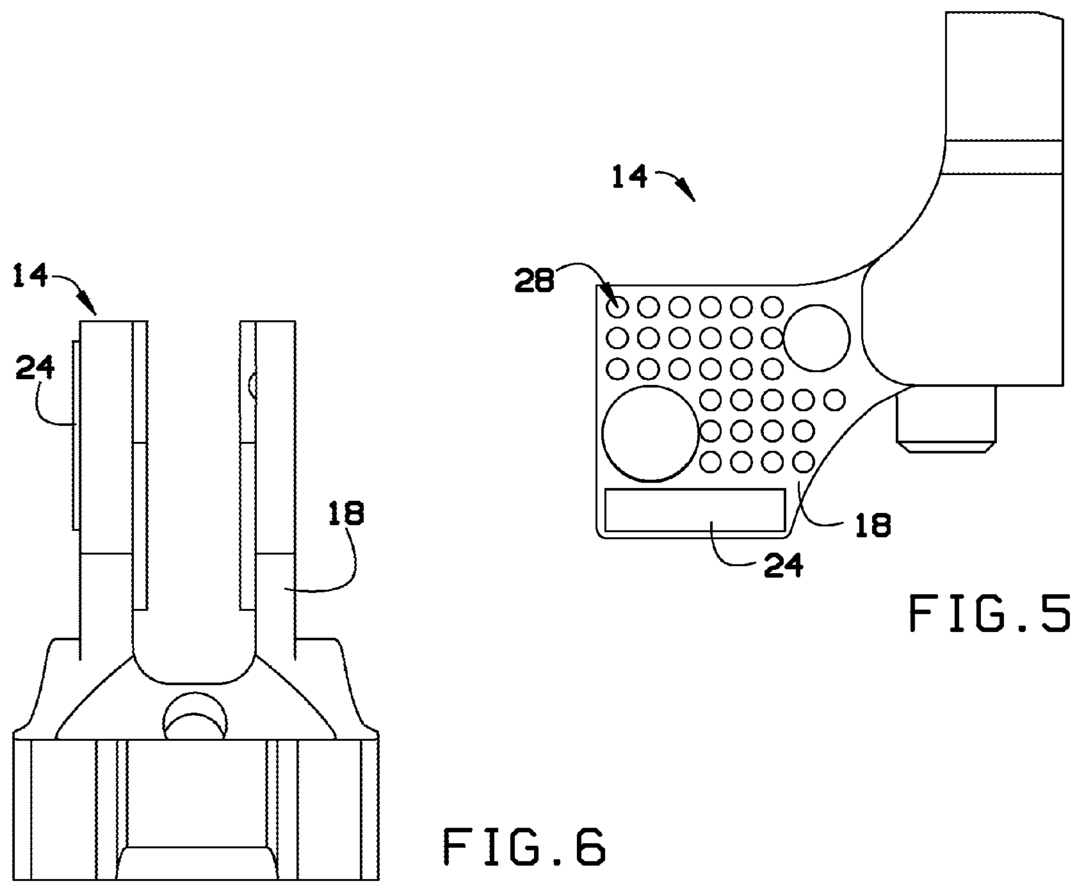
FIG.5
FIG.6

POLYMER/COMPOSITE FIREARMS AND A PROCESS FOR STRENGTHENING POLYMER/COMPOSITE FIREARMS

CROSS-REFERENCE TO RELATED APPLICATIONS

This application is a divisional of U.S. patent application Ser. No. 13/971,681 filed on Aug. 20, 2013, and titled "Polymer/Composite Firearms and a Process for Strengthening Polymer/Composite Firearms", the contents of which is incorporated herein by reference.

BACKGROUND OF THE INVENTION

The present invention relates to firearms and, more particularly, to strengthened polymer/composite firearms and methods for strengthening the same.

Polymer/composite firearms are used because they cost less and are light weight. Currently, there are weak or commonly known failure areas in polymer/composite firearms and firearms components. The components are not durable and sacrifice strength and the ability to withstand the extreme pressures and stresses created upon firing a round of ammunition in exchange for the lighter weight.

As can be seen, there is a need for a process that strengthens polymer/composite firearms in areas that are weak or commonly fail without losing the positive properties of a polymer/composite firearm.

SUMMARY OF THE INVENTION

In one aspect of the present invention, a strengthened firearm comprises at least one metal/composite material formed into at least one firearm component; and a polymer/composite material combined with the at least one firearm component.

In another aspect of the present invention, a method for strengthening polymer/composite firearms comprises forming at least one metal/composite material to a desired shape of at least one firearm component; inserting the at least one metal/composite material in a polymer/composite firearm mold; and combining the at least one metal/composite material and a polymer/composite material into a strengthened firearm.

These and other features, aspects and advantages of the present invention will become better understood with reference to the following drawings, description and claims.

BRIEF DESCRIPTION OF THE DRAWINGS

FIG. 4 is a perspective view of a stock buffer tube mount of an exemplary embodiment of the present invention;

FIG. 5 is a side view of the stock buffer tube mount of an exemplary embodiment of the present invention;

FIG. 6 is a top view of the stock buffer tube mount of an exemplary embodiment of the present invention;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a strengthened firearm and method. The strengthened firearm may include at least one metal/composite material formed into at least one firearm component, and a polymer/composite material combined with the at least one firearm component. The metal/composite material replaces the polymer/composite material in a specific area of the firearm that may be weak or tend to fail earlier than other areas of a polymer/composite firearm. The method of combining the multiple materials allows for additional strength in the firearm.

In composite/polymer firearms there are multiple areas or components that tend to fail earlier than other areas. The polymer used for molding may be a glass, Kevlar or carbon fiber filled nylon, glass, Kevlar or carbon fiber filled polyetherimide. The body may be molded out of any number of plastics that give the desired performance characteristics whether filled or unfilled. A process to strengthen these areas or components may increase the life span of the firearm. The process for strengthening polymer/composite firearms as herein described refers to specific components of a firearm. However, other components may be designed in a similar manner within the scope of the present invention.

Figure 1:
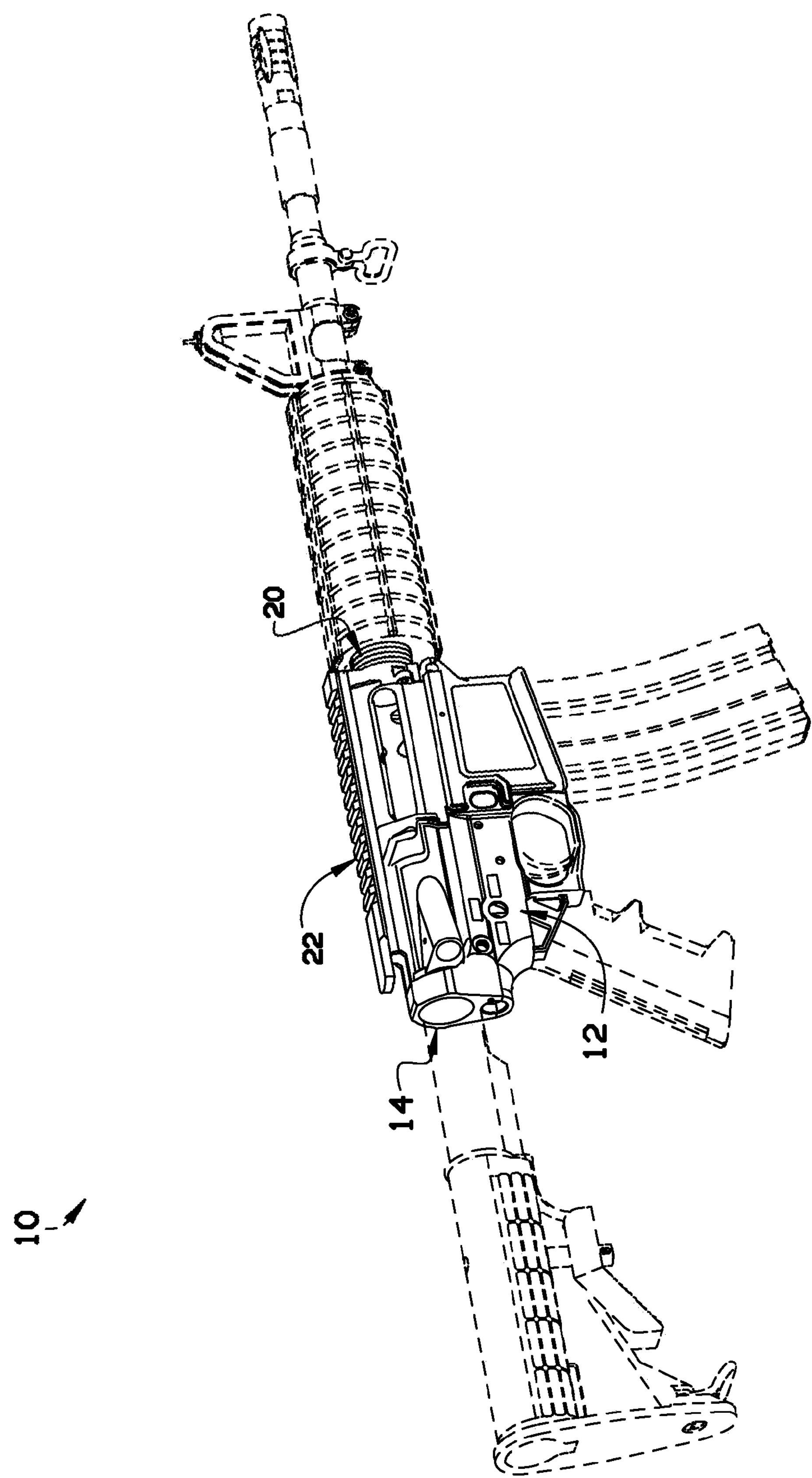
FIG. 1 is a perspective view of an exemplary embodiment of the present invention in use.
Figure 2:
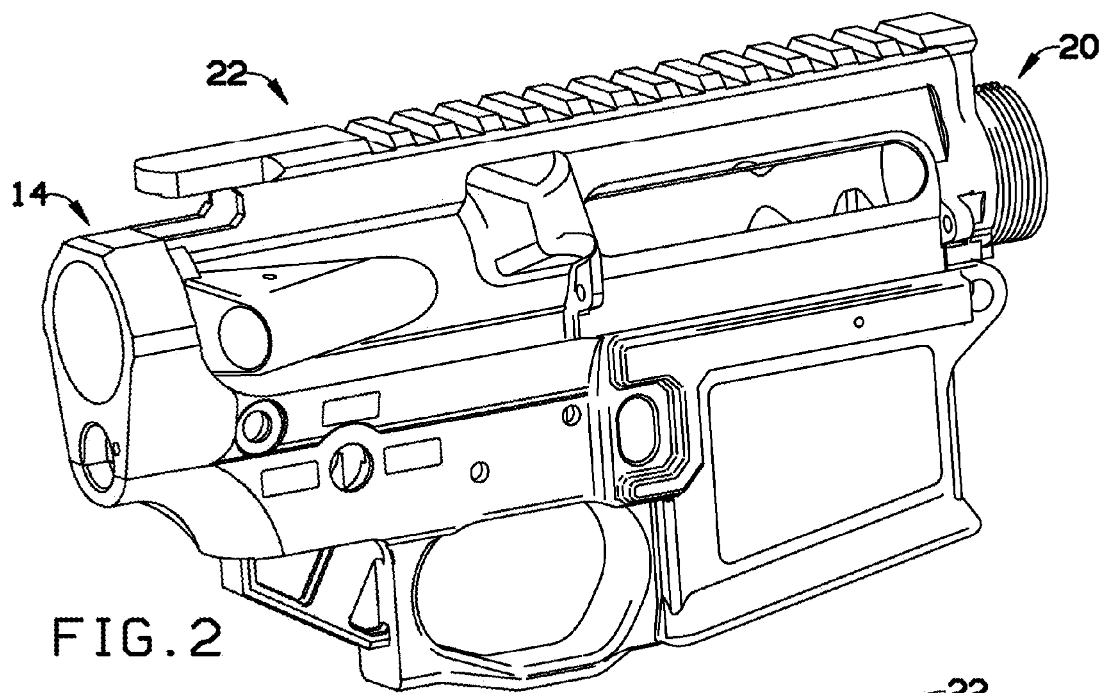
FIG. 2 is a detail perspective view of an exemplary embodiment of the present invention omitting multiple parts for illustrative clarity.
Figure 3:
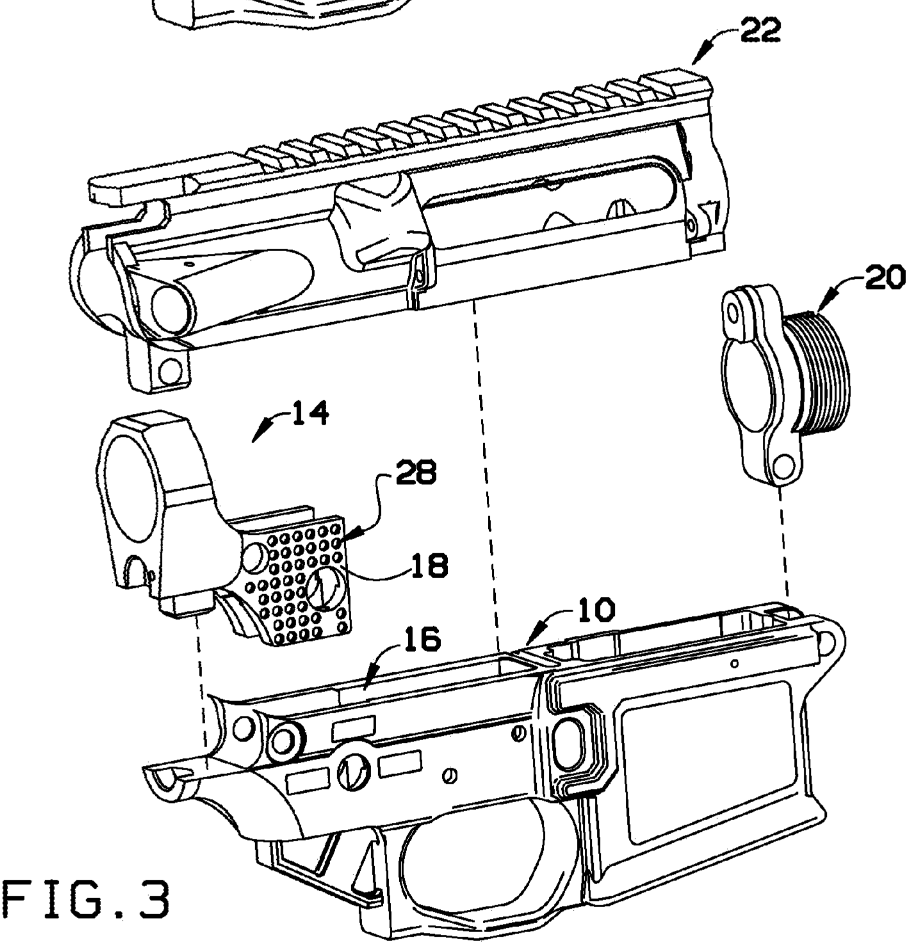
FIG. 3 is an exploded view of an exemplary embodiment of the present invention.
Figure 7:
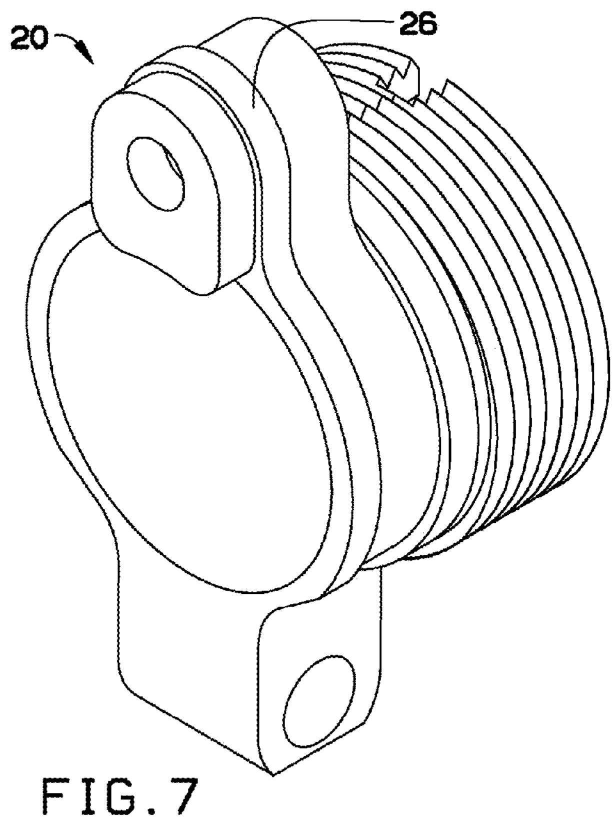
FIG. 7 is a perspective view of a barrel receiver of an exemplary embodiment of the present invention.
Figure 8:
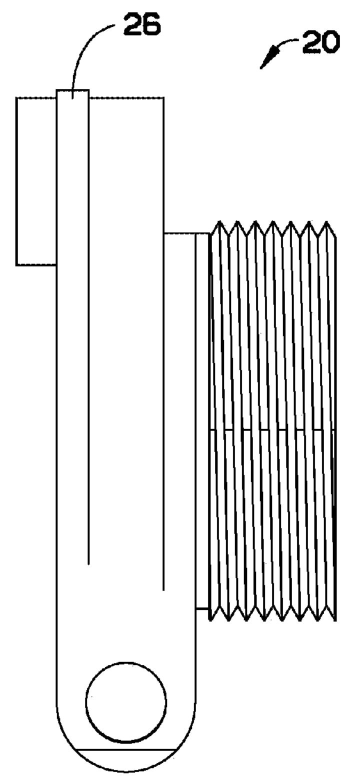
FIG. 8 is a side view of a barrel receiver of an exemplary embodiment of the present invention.
Figure 9:
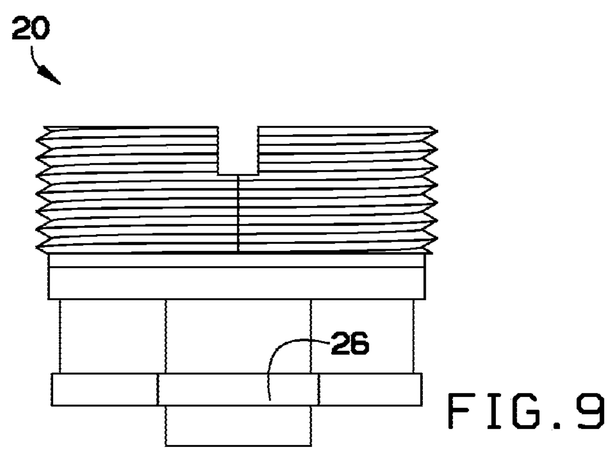
FIG. 9 is a top view of a barrel receiver of an exemplary embodiment of the present invention.

As is illustrated in FIGS. 1 through 9, an exemplary firearm 10 may include a stock/buffer tube mount 14, a polymer/composite receiver 12, a barrel receiver 20 and a polymer/composite upper receiver 22. The stock/buffer tube mount 14 may have a lower portion and may include a stock/buffer tube thread receiver insert joint 18 and a tube mount retainment feature 28. The stock/buffer tube thread receiver insert joint 18 may be attached to the stock/buffer tube mount 14. In certain embodiments, the stock/buffer tube thread receiver insert joint 18 may be attached to the lower portion of the stock/buffer tube mount 14 as is shown in FIGS. 4 through 6. The stock/buffer tube mount 14 may be made from a metal material, a composite material, or a metal/composite material. The stock/buffer tube mount 14 may then become a metal/composite firearm component. The metal material may be aluminum alloys, steel, titanium and the like. The composite material may include, but is not limited to, carbon fiber, Kevlar, fiberglass and the like.

In certain embodiments, at least one metal/composite material with the tube mount retainment feature 28 may be manufactured to the desired shape of the specific at least one firearm component of the specific firearm model. The at least one firearm component may be inserted into a firearm mold. The polymer/composite material may then be injected around the at least one metal/composite component. The specific at least one firearm component may then have the desired and designed strength increase over just a strictly polymer/composite firearm model. The over molded at least one metal/composite component has the designed tube mount retainment feature 28 that may allow plastic to flow into the tube mount retainment feature 28 areas so that the at least one firearm component may be held in place and the desired strength may be achieved. The designed tube mount retainment feature 28 shows a specific style in FIGS. 3 through 5.

However, other styles such as undercuts, slots, holes and the like, may be used in a similar manner within the scope of the present invention. A stock/buffer tube over molding area 16 along the exemplary firearm 10 may be where the stock/buffer tube thread receiver insert joint 18 may be over molded. A serial number plate 24 may be disposed along the stock/buffer tube thread receiver insert joint 18.

The barrel receiver 20 may be another part of the firearm that may need additional strength. Similar to the stock/buffer tube mount 14, the barrel receiver 20 may require a barrel receiver retainment feature 26. The barrel receiver 20 may be made from a metal/composite material or the like. The barrel receiver retainment feature 26 may retain the barrel receiver 20 so that polymer/composite material may be injected around the metal/composite part.

Instead of taking material away from the firearm to reduce weight and gain the advantages of plastic properties of polymer/composite firearms, the present process may replace the necessary components altogether with a stronger material, such as a metal material, a composite material or a metal/composite material, that covers a large surface area by having this stronger material added to specific targeted components of the polymer/composite firearm that may cause early failure of the polymer/composite firearm. When the strengthen firearm may be used, the energy of a recoil of the bolt may be spread out along a large surface area across the metal material, composite material or metal/composite material. By spreading out the energy, the at least one firearm component may have an extended life span due to less fatigue.

In certain embodiments, the method of combining the metal/composite material and the polymer/composite material may involve over molding, insert molding, using a retaining feature such as fastener, like in a snap type of fastening and the like, or gluing the metal/composite component to any area of needed strength along the firearm. The present process may be used on an AR-15 as shown in the Figures, but may also be used on any firearm. The present process may be used on receivers, buffer tube mounts and any other part of the firearm that may need strengthening. In alternate embodiments of the invention, the same process may be used for medical devices, over molding cell phone metal bases, electrical bus ways for electrical distribution and the like.

It should be understood, of course, that the foregoing relates to exemplary embodiments of the invention and that modifications may be made without departing from the spirit and scope of the invention as set forth in the following claims.

What is claimed is:

1. An upper receiver comprising:

a main portion having an internal cavity, a forward end, a rear end, and a molding area disposed near the forward end; and a barrel receiver disposed at the forward end of the main portion, the barrel receiver comprising a threaded portion extending forward from the main portion and at least one retainment feature disposed inside the molding area, wherein:

the main portion comprises a polymer material; and the barrel receiver comprises a second material such that the second material has increased strength compared to the polymer material.

2. The upper receiver of claim 1, wherein the barrel receiver is configured to be attached to the main portion due to polymer material that is over molded and injected into the molding area such that the polymer material flows near the retainment feature to fixedly hold the barrel receiver in place with respect to the main portion.

3. The upper receiver of claim 1, wherein the retainment feature is disposed on a rear side of the threaded portion.

4. The upper receiver of claim 1, wherein the retainment feature is a protrusion.

5. The upper receiver of claim 4, wherein the retainment feature is disposed on an outer surface of the barrel receiver.

6. The upper receiver of claim 5, wherein at least a portion of the retainment feature comprises an annular shape.

7. The upper receiver of claim 5, wherein the retainment feature is symmetric between a left side and a right side of the barrel receiver.

8. The upper receiver of claim 1, wherein the second material is selected from the group consisting of aluminum, steel, carbon fiber, Kevlar, carbon fiber filled nylon, glass, and Kevlar or carbon fiber filled polyetherimide.

9. An upper receiver comprising:

a polymer upper receiver housing defining a cavity; and an insert secured within the polymer upper receiver housing wherein the insert is configured to threadably engage a barrel nut to detachably secure a barrel to the upper receiver.

10. The upper receiver of claim 9, wherein:

the polymer upper receiver housing comprises a forward end, a rear end, and a molding area disposed near the forward end; and the insert comprises a barrel receiver disposed at the forward end of the polymer upper receiver housing, the barrel receiver comprising a threaded portion extending forward from the polymer upper receiver housing and at least one retainment feature disposed inside the molding area.

11. The upper receiver of claim 9, wherein the insert comprises a second material such that the second material has increased strength compared to a material of the polymer upper receiver housing.

12. The upper receiver of claim 10, wherein the barrel receiver is configured to be attached to the polymer upper receiver housing due to polymer material that is over molded and injected into the molding area such that the polymer material flows near the retainment feature to fixedly hold the barrel receiver in place with respect to the polymer upper receiver housing.

13. The upper receiver of claim 10, wherein the retainment feature is disposed on a rear side of the threaded portion.

14. The upper receiver of claim 10, wherein the retainment feature is a protrusion.

15. The upper receiver of claim 10, wherein the retainment feature is disposed on an outer surface of the barrel receiver.

16. The upper receiver of claim 10, wherein the retainment feature comprises an annular shape.

17. The upper receiver of claim 11, wherein the second material is selected from the group consisting of aluminum, steel, carbon fiber, Kevlar, carbon fiber filled nylon, glass, and Kevlar or carbon fiber filled polyetherimide.

* * * * *